US007370175B2

(12) United States Patent
Zimmer et al.

(10) Patent No.: US 7,370,175 B2
(45) Date of Patent: May 6, 2008

(54) SYSTEM, METHOD, AND APPARATUS TO AGGREGATE HETEROGENEOUS RAID SETS

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 202 days.

(21) Appl. No.: 11/394,481

(22) Filed: Mar. 31, 2006

(65) Prior Publication Data

US 2007/0239932 A1 Oct. 11, 2007

(51) Int. Cl.
*G06F 12/16* (2006.01)
*G06F 13/00* (2006.01)

(52) U.S. Cl. .......................................... 711/714; 714/6
(58) Field of Classification Search ...................... None
See application file for complete search history.

(56) References Cited

U.S. PATENT DOCUMENTS

| | | | |
|---|---|---|---|
| 6,938,124 | B2 | 8/2005 | Rust et al. |
| 6,938,181 | B1 | 8/2005 | Talagala et al. |
| 7,096,338 | B2* | 8/2006 | Takahashi et al. .......... 711/165 |
| 7,155,593 | B2* | 12/2006 | Kano .......................... 711/165 |
| 7,281,109 | B2* | 10/2007 | Kano .......................... 711/165 |
| 2002/0199077 | A1 | 12/2002 | Goodman et al. |
| 2005/0108375 | A1* | 5/2005 | Hallak-Stamler ........... 709/223 |
| 2005/0114464 | A1* | 5/2005 | Amir et al. .................. 709/213 |
| 2006/0179218 | A1* | 8/2006 | Burkey ........................ 711/114 |
| 2006/0236054 | A1* | 10/2006 | Kitamura .................... 711/165 |

FOREIGN PATENT DOCUMENTS

EP 01510947 A1 3/2005
EP 01586996 A2 10/2005

OTHER PUBLICATIONS

PCI Express Base Specification Revision 1.0, Jul. 22, 2002, 428 pgs.

(Continued)

*Primary Examiner*—Kevin Verbrugge
(74) *Attorney, Agent, or Firm*—Grossman, Tucker, Perreault & Pfleger, PLLC

(57) ABSTRACT

A method according to one embodiment may include partitioning a plurality of core processors into a main partition comprising at least one processor core capable of executing an operating system and an embedded partition comprising at least one different processor core. The main partition and embedded partition may communicate with each other through a bridge. The embedded partition of this embodiment may be capable of: mapping two or more mass storage systems, coupled to the embedded partition, into a single logical device; presenting the logical device to the bridge; and receiving at least one I/O request, generated by the main partition and directed to the logical device, and in response to the I/O request, the embedded partition may be further capable of communicating with at least one of the two or more mass storage systems using at least one communication protocol to process said I/O request; and reporting the status of the I/O request to the main partition, via the bridge.

20 Claims, 4 Drawing Sheets

OTHER PUBLICATIONS

PCI-X Addendum to the PCI Local Bus Specification Revision 1.0a, Jul. 24, 2000 PCI Special Interest Group, 240 pgs.

American National Standard: For Informaion Technology-Fibre Channel-Physical and Signalling Interface-3 (FC-PH-3), Developed by Incits, 1998, 116 pgs.

Serial ATA: High Speed Serialized AT Attachment: Revision 1.0a, Jan. 7, 2003, APT Technologies, Inc., Dell Computer Corporation, IBM Corporation, Intel Corporation, Maxtor Corporation, Seagate Corporation, 311 pgs.

Information Technology—Serial Attached SCSI—1.1 (SAS-1.1), Working Draft American National Standard: Project T10/1562-D Revision 1, Sep. 18, 2003, 464 pgs.

Serial ATA II: Extensions to Serial ATA 1.0a Revision 1.2, Aug. 27, 2004, 110 pgs.

International Search Report and Written Opinion mailed on Aug. 31, 2007 for application No. PCT/US2007/064693, 10 pgs.

* cited by examiner

SYSTEM, METHOD, AND APPARATUS TO AGGREGATE HETEROGENEOUS RAID SETS

FIELD

The present disclosure relates to a system, method and apparatus to aggregate heterogeneous RAID sets.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
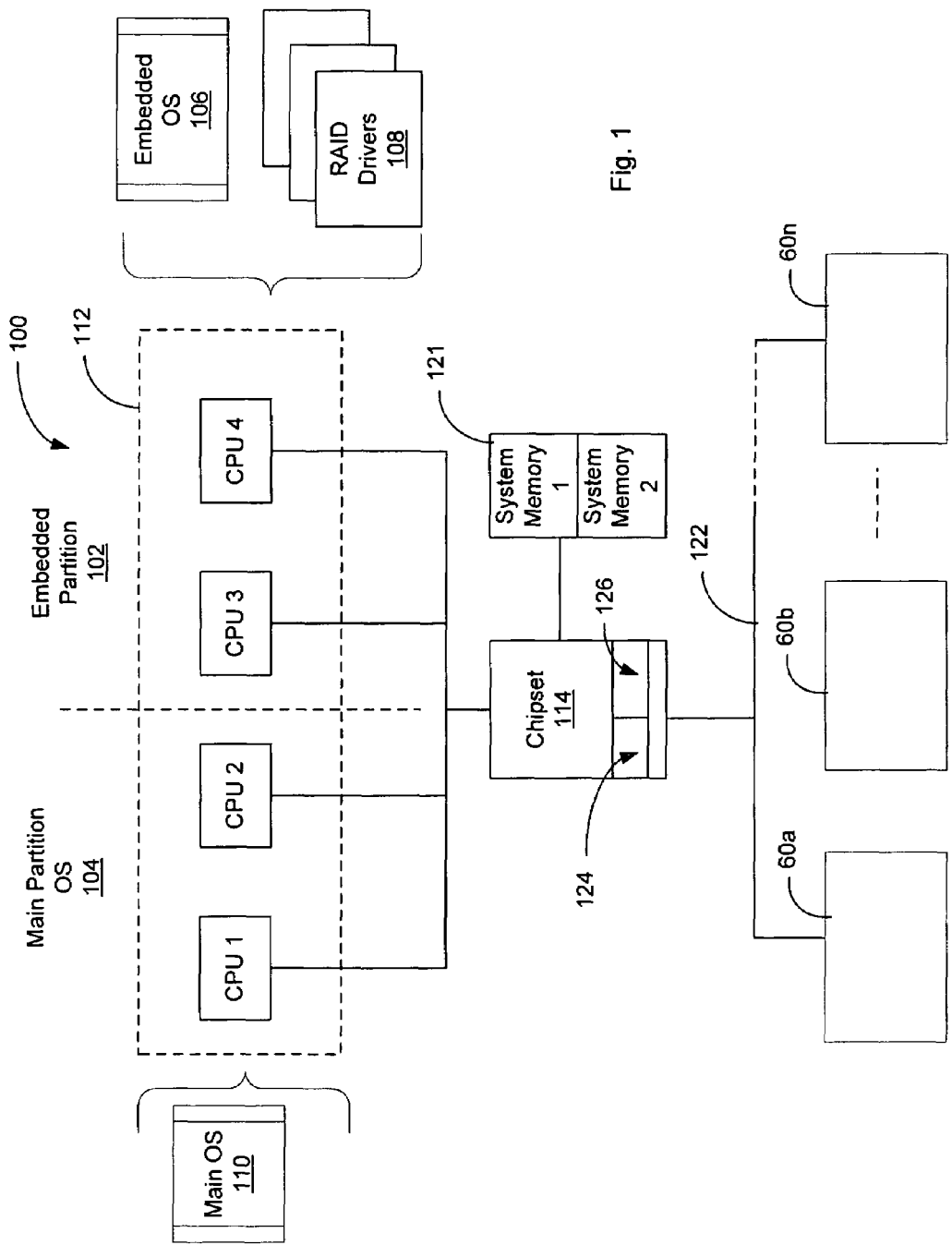
FIG. 1 is a diagram illustrating a system embodiment.

FIG. 1 a system embodiment 100 of the claimed subject matter. The system 100 may generally include a multiple core (multi-core) host processor 112, a chipset 114, and system memory 121. The multi-core host processor 112 may include any variety of processors known in the art having a plurality of cores, for example, an Intel® Pentium® D dual core processor commercially available from the Assignee of the subject application. Host processor 112 may comprise an integrated circuit (IC), such as a semiconductor integrated circuit chip.

In this embodiment, the multi-core processor 112 may include a plurality of core CPUs, for example, CPU1, CPU2, CPU3 and CPU4. Of course, additional or fewer processor cores may be used in this embodiment. The multi-core processor 112 may be logically and/or physically divided into a plurality of partitions. For example, in this embodiment, processor 112 may be divided into a main partition 104 that includes CPU1 and CPU2, and an embedded partition 102 that includes CPU3 and CPU4. The main partition 104 may be capable of executing a main operating system (OS) 110, which may include, for example, a general operating system such as Windows XP, Linux, etc. The embedded partition 102 may be capable of executing an embedded OS 106. As will be described in greater detail below, the embedded operating system 106 may be capable of controlling the operation of one or more mass storage devices coupled to the chipset 114.

System memory 121 may comprise one or more of the following types of memories: semiconductor firmware memory, programmable memory, non-volatile memory, read only memory, electrically programmable memory, random access memory, flash memory (which may include, for example, NAND or NOR type memory structures), magnetic disk memory, and/or optical disk memory. Either additionally or alternatively, memory 121 may comprise other and/or later-developed types of computer-readable memory. Machine-readable firmware program instructions may be stored in memory 121. As described below, these instructions may be accessed and executed by the main partition 104 and/or the embedded partition 102 of host processor 112. When executed by host processor 112, these instructions may result in host processor 112 performing the operations described herein as being performed by host processor 112. In this embodiment, memory 121 may be logically and/or physically partitioned into system memory 1 and system memory 2. System memory 1 may be capable of storing commands, instructions, and/or data for operation of the main partition 104, and system memory 2 may be capable of storing commands, instructions, and/or data for operation of the embedded partition 102.

Chipset 114 may include integrated circuit chips, such as those selected from integrated circuit chipsets commercially available from the assignee of the subject application (e.g., graphics memory and I/O controller hub chipsets), although other integrated circuit chips may also, or alternatively be used. Chipset 114 may include inter-partition bridge (IPB) circuitry 124. "Circuitry", as used in any embodiment herein, may comprise, for example, singly or in any combination, hardwired circuitry, programmable circuitry, state machine circuitry, and/or firmware that stores instructions executed by programmable circuitry. The IPB 124 may be capable of providing communication between the main partition 104 and the embedded partition 102. Chipset 114 also may be coupled to a plurality of mass storage systems via communications link 122.

Embedded partition 102 may be capable of controlling the operation of a plurality of mass storage systems 60a, 60b, . . . , 60n. In this embodiment, mass storage systems 60a, 60b, . . . , 60n may each comprise, e.g., one or more redundant arrays of independent disks (RAID) systems. RAID systems 60a, 60b, . . . , 60n may comprise, for example, one or more disk mass storage devices and/or one or more peripheral devices. The RAID level that may be implemented by RAID systems 60a, 60b, . . . ,60n may be a RAID level 0, 1 or number greater than 1. In this embodiment, each of the RAID system 60a, 60b, . . . , 60n may comprise different RAID systems, which may mean that at least two of the RAID systems described herein may be manufactured and/or sold by different vendors. Different RAID systems may be distinguished by how RAID fault-tolerance metadata is encoded on the actual disk drive media.

In this embodiment, embedded partition 102 may be capable of controlling the chipset 114 to exchange commands and/or data with one or more of the RAID systems 60a, 60b, . . . , 60n coupled to chipset 114 using at least one of a plurality of communication protocols. If a Fibre Channel (FC) protocol is used by embedded partition 102 to exchange data and/or commands with RAID systems 60a, 60b, . . . , 60n, it may comply or be compatible with the interface/protocol described in "ANSI Standard Fibre Channel Physical and Signaling Interface-3 X3.303:1998 Specification." Alternatively or additionally, if a serial ATA (SATA) protocol is used by embedded partition 102 to exchange data and/or commands RAID systems 60a, 60b, . . . , 60n, it may comply or be compatible with the protocol described in "Serial ATA: High Speed Serialized AT Attachment," Revision 1.0a, published on Jan. 7, 2003 by the Serial ATA Working Group and/or the protocol described in "Serial ATA II: Extensions to Serial ATA 1.0a," Revision 1.2, published Aug. 27, 2004 by the Serial ATA Working Group earlier and/or later published versions of the SATA standard. Further alternatively or additionally, if a serial attached small computer system interface (SAS) protocol is used by embedded partition 102 to exchange data and/or commands with RAID systems 60a, 60b, . . . , 60n, it may comply or be compatible with the protocol described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or earlier and/or later published versions of the SAS Standard.

The embedded partition 102 may be capable of gathering information related to the RAID systems 60a, 60b, . . . , 60n coupled to the chipset 114. Embedded partition 102 may also be capable of mapping two or more of the RAID systems 60a, 60b, . . . , 60n into a logical device 126. To that end, embedded partition 102 may be capable of generating a map that correlates logical block address (LBA) information of at least two of the plurality of RAID systems 60a, 60b, . . . , 60n and the LBA information of the logical device 126. The logical device 126 may include, for example, a single large extended device (SLED). The logical device 126 may be stored in the IPB 124, so that the main partition 104 can access the logical device 126.

As stated, the embedded partition 102 may be capable of executing an embedded OS 106. The embedded OS 106 may include, for example, BSD variant (OpenBSD, NetBSD, FreeBSD), Linux, Windows CE, and/or other operating system, such as a Real-Time OS (VxWorks, ThreadX, RTLinux), or even an OS-absent operational environment (e.g., EFI). In operation, the embedded OS 106 may execute one or more RAID drivers 108 to control the operation of one or more of the RAID systems 60a, 60b, . . . , 60n coupled to the chipset 114. Thus, RAID I/O traffic for the plurality of RAID systems 60a, 60b, . . . , 60n may be processed through the embedded partition 102. Even though given RAID systems may employ similar RAID levels, different vendors may use different encoding specific to their own RAID systems. These encodings may be reflected in the RAID drivers 108, as may be provided by each respective vendor of the RAID system coupled to the system 100. The encodings may be associated with the metadata on the drive that allows for the interpreting the RAID set. The encodings may include, but are not limited to, the strip-size, RAID level (e.g., RAID level 0-6), logical volume size, drive-to-logical-volume mapping, etc.

The main OS 110 may be capable of generating one or more I/O requests (e.g., read and/or write requests) directed to the logical device 126. To that end, the main partition 104 may be capable of communicating with the logical device 126 using a plurality of communication protocols. For example, the main partition 104 may be capable of communicating with the logical device 126 using the aforementioned SATA communications protocol and/or parallel ATA (PATA) communications protocol.

In response to an I/O request generated by the main partition 104 directed to the logical device 126, the IPB 124 may generate an interrupt to the embedded partition 102 to process the I/O request generated by the main OS 110. In response to the interrupt generated by the IPB 124, the embedded partition 102 may be capable of determining which RAID system, among the plurality of available RAID systems 60a, 60b, . . . , 60n, may correlate to the I/O request generated by the main partition 104. This operation may include, for example, calling the map that correlates LBA information on the logical device 126 and the RAID systems 60a, 60b, . . . , 60n. The embedded partition 102 may also be capable of translating the I/O request from the communication protocol as may be generated by the main partition 104 into a communication protocol compatible with the RAID system corresponding to the I/O request. Once the I/O transaction is complete (or if the I/O transaction fails), the embedded partition 102 may be capable of reporting the status of the I/O transaction to the main partition 104, via the IPB 124. The embedded partition may queue a series of I/O requests and dispatch them out-of-order or in-order, even if the underlying I/O device does not support out-of-order or multiple outstanding transactions (e.g., SCSI tagged command queueing).

Thus, while the embedded partition 102 may be capable of controlling I/O transactions with the RAID systems coupled thereto, the main partition 104 may be capable of I/O transactions with the logical device 126, via the IPB 124. This may enable, for example, the RAID systems 60a, 60b, . . . , 60n to be concealed from the main partition 104. The may also enable the plurality of RAID drivers 108 (corresponding to the RAID systems 60a, 60b, . . . , 60n) to be concealed from the main partition 104.

Figure 2:
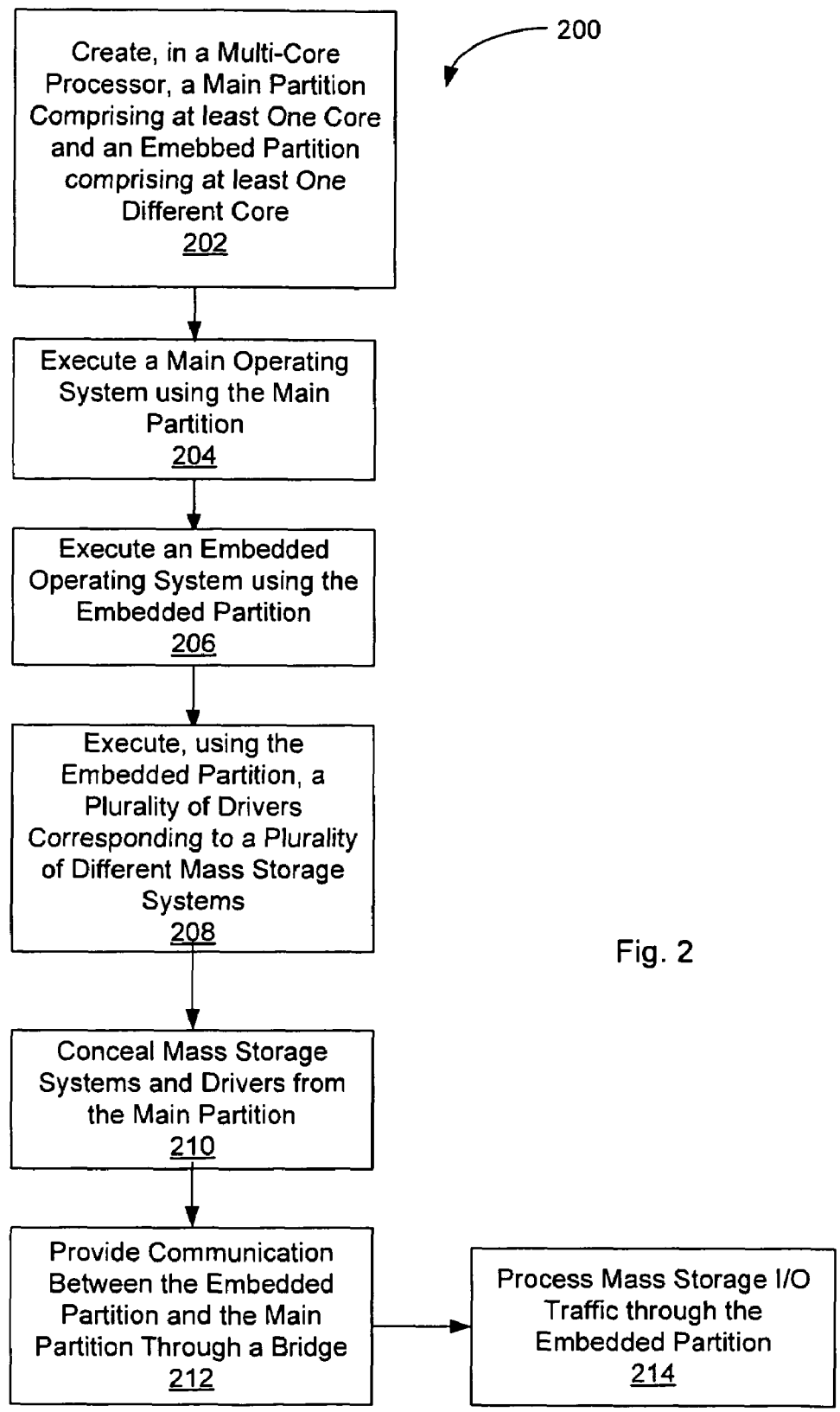
FIG. 2 is a diagram illustrating exemplary operations according to one embodiment.

FIG. 2 is a flowchart illustrating exemplary operations 200 that may be performed according to one embodiment. Operations may include creating, in a multi-core processor, a main partition comprising at least one core and an embedded partition comprising at least one different core 202. Operations may also include executing a main operating system using the main partition 204. Operations may also include executing an embedded operating system using the embedded partition 206. Operations may additionally include executing, using the embedded partition, a plurality of drivers corresponding to a plurality of different mass storage systems 208. Operations may further include concealing the mass storage systems and drivers from the main partition 210. Operations may also include providing communication between the embedded partition and the main partition through a bridge 212. Operations may additionally include processing mass storage I/O traffic through the embedded partition 214.

Figure 3:
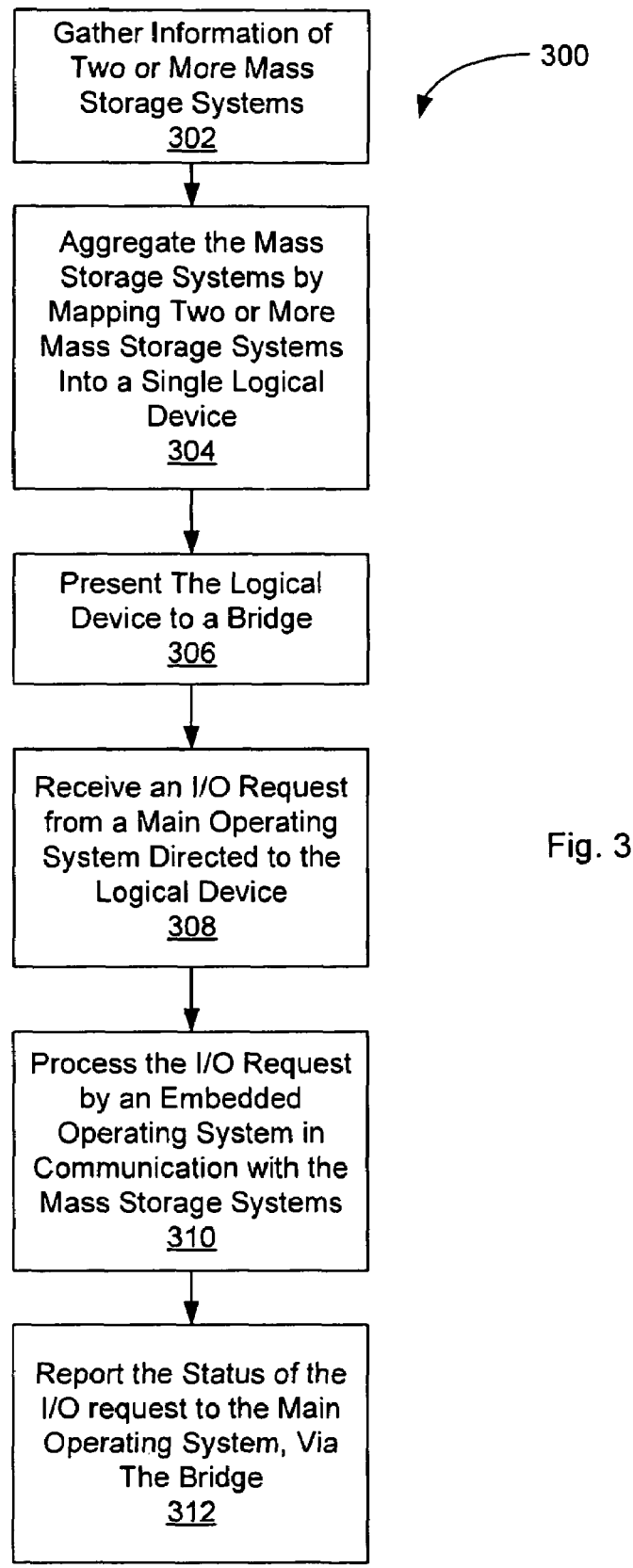
FIG. 3 is a diagram illustrating exemplary operations according to another embodiment.

FIG. 3 is a flowchart illustrating exemplary operations 300 that may be performed according to another embodiment. Operations may include gathering information of two or more mass storage systems 302. Operations may further include aggregating the mass storage systems by mapping two or more mass storage systems into a single logical device 304. Operations may also include presenting the logical device to a bridge 306. Operations may further include receiving an I/O request from a main operating system directed to the logical device 308. Operations may additionally include processing the I/O request by an embedded operating system in communication with the mass storage systems 310. Operations may also include reporting the status of the I/O request to the main operating system, via the bridge 312. These operations may include synchronous I/O commands from main partition and a response with data from the embedded partition, and/or a plurality of these I/O requests can be batched by the embedded partition and issued in a variety of ways, for example ordered based upon latest disk head location via known sorting mechanisms for disk-drive scheduling (such as the "elevator algorithm").

Figure 4:
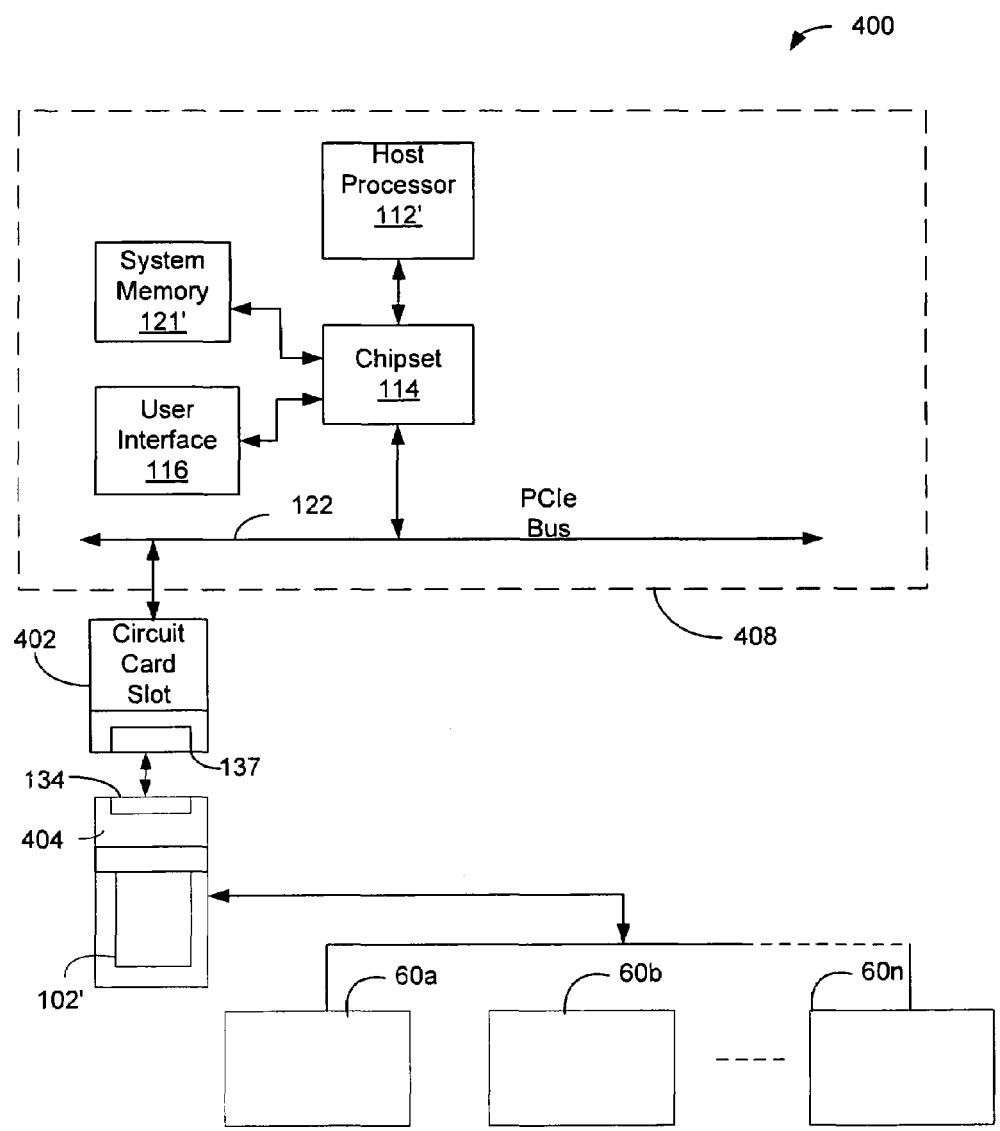
FIG. 4 is a diagram illustrating another system embodiment.

FIG. 4 illustrates a system embodiment 400 of the claimed subject matter. The system 400 may generally include a host processor 112', a first bus 122, a user interface system 116, a chipset 114', system memory 121', a circuit card slot 402 and a circuit card 404. The host processor 112 may include any variety of processors known in the art such as an Intel® Pentium® IV processor commercially available from the Assignee of the subject application. The bus 122 may include various bus types to transfer data and commands. For instance, bus 122 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus").

Circuit card 402 may be coupled to and control the operation of mass storage systems 60*a*, 60*b*, . . . , 60*n*. Depending upon, for example, whether bus 12 comprises a PCI Express™ bus or a PCI-X bus, circuit card slot 402 may comprise, for example, a PCI Express™ or PCI-X bus compatible or compliant expansion slot or interface. The interface may comprise a bus connector 137 may be electrically and mechanically mated with a mating bus connector 134 that may be comprised in the circuit card 402.

The operational features of this embodiment may be similar to those described above with reference to FIGS. 1-3. However, in this embodiment, the embedded partition 102' may be comprised in the circuit card 404. The embedded partition 102' may comprise one or more integrated circuits on the circuit card 404. In this embodiment, the host system 406 may operate as the main partition 104 (described above), while embedded partition 102' may operate in a manner similar to the embedded partition 102 described above. The host system 406 may be capable of executing a main OS while the embedded partition 102' may be capable of executing an embedded OS. The inter-partition bridge (IPB) may reside in chipset 114 (as described above), or alternatively or additionally, may reside in the embedded partition 102' on the circuit card 404.

Thus, in summary, at least one embodiment herein may include an integrated circuit (IC) comprising a plurality of processor cores. The IC may include a main partition comprising at least one processor core capable of executing a main operating system and an embedded partition comprising at least one different processor core. The main partition and embedded partition may communicate with each other through a bridge. In one embodiment, the embedded partition is capable of performing the following operations: mapping two or more mass storage systems coupled to the embedded partition, into a single logical device; presenting the logical device to the bridge; and receiving at least one I/O request, generated by the main partition and directed to the logical device. In response to the I/O request, the embedded partition may be further capable of communicating with at least one of the two or more mass storage systems using at least one communication protocol to process the I/O request; and reporting the status of said I/O request to the main partition, via the bridge.

It should be noted that, in addition to the embodiments described above, the operative circuitry of the embedded partition may reside in one or more of the mass storage systems 60*a*, 60*b*, . . . , 60*n*. Advantageously, the integrated circuit of the embodiments described herein may permit concealing of vendor-specific drivers for mass storage systems from a main operating system, while allowing the main operating system to indirectly conduct I/O transactions with the mass storage systems. Further, the integrated circuit of the embodiments described herein may be capable of aggregating a plurality of mass storage systems into a single logical device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus, comprising:
an integrated circuit (IC) comprising a plurality of processor cores, said IC having a main partition comprising at least one processor core capable of executing a main operating system and an embedded partition comprising at least one different processor core, said main partition and embedded partition are capable of communicating with each other through a bridge, the embedded partition is capable of performing the following operations:
mapping two or more mass storage systems, coupled to the embedded partition, into a single logical device;
presenting the logical device to the bridge; and
receiving at least one I/O request, generated by the main partition and directed to the logical device, and in response to said I/O request, said embedded partition is further capable of communicating with at least one of the two or more mass storage systems using at least one communication protocol to process said I/O request; and reporting the status of said I/O request to the main partition, via said bridge.

2. The apparatus of claim 1, wherein:
said mass storage systems each comprise a redundant array of independent disk (RAID), and each RAID system comprises different RAID systems, said embedded partition is further capable of executing drivers for each said different RAID system, said drivers and said RAID systems being provided by different vendors.

3. The apparatus of claim 1, wherein:
said embedded partition is further capable of concealing said mass storage systems from said main partition.

4. The apparatus of claim 2, wherein:
said embedded partition is further capable of concealing said drivers and said RAID systems from said main partition.

5. The apparatus of claim 1, wherein:
said I/O request is generated by said main partition using a first communication protocol, said embedded partition is further capable of communicating with at least one of the two or more mass storage systems using a second communication protocol, and said embedded partition is further capable of translating between said first and second communication protocols.

6. A system, comprising:
at least one circuit card being capable of being coupled to a bus, said circuit card comprising an integrated circuit (IC) comprising a plurality of processor cores, said IC having a main partition comprising at least one processor core capable of executing a main operating system and an embedded partition comprising at least one different processor core, said main partition and embedded partition are capable of communicating with each other through a bridge, the embedded partition is capable of performing the following operations:
mapping two or more mass storage systems coupled to the embedded partition, into a single logical device;
presenting the logical device to the bridge; and
receiving at least one I/O request, generated by the main partition and directed to the logical device, and in response to said I/O request, said embedded partition is further capable of communicating with at least one of the two or more mass storage systems using at least one communication protocol to process said I/O request; and reporting the status of said I/O request to the main partition, via said bridge.

7. The system of claim 6, wherein:
said mass storage systems each comprise a redundant array of independent disk (RAID), and each RAID system comprises different RAID systems, said embedded partition is further capable of executing drivers for each said different RAID system, said drivers and said RAID systems being provided by different vendors.

8. The system of claim 6, wherein:
said embedded partition is further capable of concealing said mass storage systems from said main operating system.

9. The system of claim 7, wherein:
said embedded partition is further capable of concealing said drivers and said RAID systems from said main operating system.

10. The system of claim 6, wherein:
said I/O request is generated by said main operating system using a first communication protocol, said embedded partition is further capable of communicating with at least one of the two or more mass storage systems using a second communication protocol, and said embedded operating system is further capable of translating between said first and second communication protocols.

11. An article comprising:
a storage medium storing instructions that when executed by a machine result in the following operations:
partitioning a plurality of core processors into a main partition comprising at least one processor core capable of executing a main operating system and an embedded partition comprising at least one different processor core, said main partition and embedded partition are capable of communicating with each other through a bridge, the embedded partition is capable of performing the following operations:
mapping two or more mass storage systems, coupled to the embedded partition, into a single logical device;
presenting the logical device to the bridge; and
receiving at least one I/O request, generated by the main partition and directed to the logical device, and in response to said I/O request, said embedded partition is further capable of communicating with at least one of the two or more mass storage systems using at least one communication protocol to process said I/O request; and reporting the status of said I/O request to the main partition, via said bridge.

12. The article of claim 11, wherein:
said mass storage systems each comprise a redundant array of independent disk (RAID), and each RAID system comprises different RAID systems, said embedded partition is further capable of executing drivers for each said different RAID system, said drivers and said RAID systems being provided by different vendors.

13. The article of claim 11, wherein:
said embedded partition is further capable of concealing said mass storage systems from said main partition.

14. The article of claim 12, wherein:
said embedded partition is further capable of concealing said drivers and said RAID systems from said main partition.

15. The article of claim 11, wherein:
said I/O request is generated by said main partition using a first communication protocol, said embedded partition is further capable of communicating with at least one of the two or more mass storage systems using a second communication protocol, and said embedded partition is further capable of translating between said first and second communication protocols.

16. A method, comprising:
partitioning a plurality of core processors into a main partition comprising at least one processor core capable of executing an operating system and an embedded partition comprising at least one different processor core, said main partition and embedded partition are capable of communicating with each other through a bridge, the embedded partition is capable of performing the following operations:
mapping two or more mass storage systems, coupled to the embedded partition, into a single logical device;
presenting the logical device to the bridge; and
receiving at least one I/O request, generated by the main partition and directed to the logical device, and in response to said I/O request, said embedded partition is further capable of communicating with at least one of the two or more mass storage systems using at least one communication protocol to process said I/O request; and reporting the status of said I/O request to the main partition, via said bridge.

17. The method of claim 16, wherein:
said mass storage systems each comprise a redundant array of independent disk (RAID), and each RAID system comprises different RAID systems, said embedded partition is further capable of executing drivers for each said different RAID system, said drivers and said RAID systems being provided by different vendors.

18. The method of claim 16, wherein:
said embedded partition is further capable of concealing said mass storage systems from said main partition.

19. The method of claim 17, wherein:
said embedded partition is further capable of concealing said drivers and said RAID systems from said main partition.

20. The method of claim 16, wherein:
said I/O request is generated by said main partition using a first communication protocol, said embedded partition is further capable of communicating with at least one of the two or more mass storage systems using a second communication protocol, and said embedded partition is further capable of translating between said first and second communication protocols.

* * * * *

UNITED STATES PATENT AND TRADEMARK OFFICE
CERTIFICATE OF CORRECTION

PATENT NO. : 7,370,175 B2  Page 1 of 1
APPLICATION NO. : 11/394481
DATED : May 6, 2008
INVENTOR(S) : Zimmer et al.

It is certified that error appears in the above-identified patent and that said Letters Patent is hereby corrected as shown below:

Title Pg, Item (54), in "Title", after "METHOD" delete ",".

On Sheet 2 of 4, in Fig. 2 (Box 202), line 4, delete "Emebbed" and insert --Embedded --, therefor.

In column 1, line 1, after "METHOD" delete ",".

In column 6, line 62, in Claim 6, delete "systems" and insert -- systems, --, therefor.

Signed and Sealed this

Twelfth Day of August, 2008

JON W. DUDAS
*Director of the United States Patent and Trademark Office*